(12) United States Patent
Eye et al.

(10) Patent No.: US 6,975,728 B1
(45) Date of Patent: Dec. 13, 2005

(54) HIERARCHICAL KEY MANAGEMENT

(75) Inventors: Randy Eye, Mechanicsville, VA (US); David William Kravitz, Fairfax, VA (US); David Moshe Goldshlag, Silver Spring, MD (US)

(73) Assignee: Digital Video Express, L.P., Richmond, VA (US)

( * ) Notice: Subject to any disclaimer, the term of this patent is extended or adjusted under 35 U.S.C. 154(b) by 969 days.

(21) Appl. No.: 09/599,124

(22) Filed: Jun. 22, 2000

Related U.S. Application Data

(60) Provisional application No. 60/140,211, filed on Jun. 22, 1999.

(51) Int. Cl.[7] ............................................. H04L 9/14
(52) U.S. Cl. ..................... 380/277; 380/45; 380/281; 380/284
(58) Field of Search ................. 380/277, 281, 380/282, 283, 284, 285, 45, 30

(56) References Cited

U.S. PATENT DOCUMENTS 4,941,176 A * 7/1990 Matyas et al. .............. 380/280
5,142,578 A * 8/1992 Matyas et al. .............. 380/280
6,307,936 B1 * 10/2001 Ober et al. .................... 380/30

OTHER PUBLICATIONS

W. Diffie and M.E. Hellman, "New Directions in Cryptography," IEEE Transactions on Information Theory, v.IT-22, No. 6, Nov. 1976, pp. 664-654.

J. Kohl, B. Neuman, and T. Ts'o. "The Evolution of the Kerberos Authentication Service," in Distributed Open Systems, F. Brazier and D. Johansen, editors, IEEE Computer Society Press, Los Almitos, CA 1994.

* cited by examiner

Primary Examiner—Justin T. Darrow
(74) Attorney, Agent, or Firm—David G. Grossman

(57) ABSTRACT

The present invention discloses a general-purpose hierarchical key management method and apparatus whose trusted operation, with respect to compromise of keying material, does not depend upon the controlling application. This enables designs that separate secure key management from the application-specific use of the keying material, and enables the rigorous evaluation of the key management module.

32 Claims, 3 Drawing Sheets

HIERARCHICAL KEY MANAGEMENT

CROSS-REFERENCE TO RELATED APPLICATION

The present application claims the benefit of provisional patent application Ser. No. 60/140,211 to Eye et al., filed on Jun. 22, 1999, entitled "General Purpose Key Management Module for Hierarchical Key Management Applications", which is hereby incorporated by reference.

TECHNICAL FIELD

This invention relates generally to the field of encryption key management, and more particularly to general-purpose key management for hierarchical key management applications.

BACKGROUND ART

There is a growing need to protect against the growing vulnerability of electronic information to unauthorized access. Computing and communications systems appear in virtually every sector of the economy and increasingly in homes and other locations. As the availability and use of computer based systems grow, so, too, does their interconnections. The result is a shared infrastructure of information, computing, and communications. The nature of shared infrastructures creates vulnerabilities for users. In general, easier access for users implies easier access for unauthorized users. Cryptography is a technology that may play an important role in addressing certain types of information vulnerability. Classically, cryptography protects data by using a cryptographic process and a shared secret called a key. In a process called encryption, plaintext may be transformed into cyphertext by an algorithm transform using a particular key; the use of a different key may result in a different cyphertext. In another process called decryption, an algorithm may transform cyphertext into plaintext using a particular key. Such a scheme, in which parties may need a common key, is called symmetric cryptography or secret-key cryptography and has the property of requiring a safe method of distributing keys to relevant parties. Methods of distributing keys to relevant parties are often called key distribution or key management. The present invention addresses the problem of key management for cryptographic systems.

Hierarchical key management systems generally depend on keys that encrypt other keys, as well as the use of the keys at the bottom of the hierarchy for confidentiality or authentication. Hierarchical key management systems typically have the problem that controlling applications may cause keys within the hierarchical key management systems to be compromised. That is, the applications may need to be trusted with respect to key compromise.

Current security architectures generally don't separate the correctness of the key management functions from the correctness of the application. This separation could simplify the design of cryptographic systems, as well as enabling the rigorous evaluation of the systems. Often systems are not implemented separately, in secure hardware.

There are several other problems that many hierarchical key management systems may have. A first problem is that there is a root entity that may compromise the entire system. A second problem is that key management systems may not be designed to support a variety of applications including: protecting the keys used to decrypt protected content, as well as the logging and charging for use of those keys; and delivering keys cryptographically embedded in tickets to users and resources.

What is needed is a hierarchical key management system that protects keys, in the sense that the controlling application may not cause keys within the hierarchical key management system to be compromised. That is, the application need not be trusted with respect to key compromise. The hierarchical key management system preferably separates the correctness of the key management functions from the correctness of the application, simplify the design of cryptographic systems and enabling the rigorous evaluation of the hierarchical key management system. Also needed is a hierarchical key management system that may be implemented separately in secure hardware, that preferably protects the root entity so that the entire system won't be compromised, and that may support a variety of applications.

DISCLOSURE OF THE INVENTION

One advantage of the invention is that it that protects keys from being compromised by a controlling application.

Another advantage of this invention is that it separates the key management functions from the application, simplifying the design of cryptographic systems that use the hierarchical key management system and enabling the rigorous evaluation of the hierarchical key management system.

Yet a further advantage of this invention is that it may be implemented separately in secure hardware.

Yet a further advantage of this invention is that it preferably protects the root entity so that the entire system won't be compromised.

Yet a further advantage of this invention is that it may support a variety of applications.

To achieve the foregoing and other advantages, in accordance with all of the invention as embodied and broadly described herein, an apparatus for key management comprising a multitude of key registers, a multitude of type fields, wherein each type field is associated with a key registers, a key management controller, key management algorithms, and key management functions.

In yet a further aspect of the invention, an apparatus for key management, wherein the key management functions may include an unwrap function, a wrap function, a data decryption function, a data encryption function, a data load function, a register clear function, and an initialize function.

In yet a further aspect of the invention, an apparatus for key management wherein the registers have a hierarchy.

In yet a further aspect of the invention, a method for key management comprising the steps of storing a data key in a key register, storing an data type for said data key in an associated type field, storing a key key in a key register, storing a key type for said key key in an associated type field, and performing a key management function on at least one key register using a key management algorithm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

BEST MODE FOR PRACTICING THE INVENTION

Hierarchical key management systems depend on keys that encrypt other keys, as well as the use of the keys at the bottom of the hierarchy for confidentiality or authentication. The present invention discloses a general purpose Key Management Module (KMM) that may protect keys, in the sense that the controlling application may not cause keys within the KMM to be compromised. That is, the application preferably does not need not be trusted with respect to key compromise.

This security architecture may separate the correctness of the key management functions from the correctness of the application. This separation simplifies the design of cryptographic systems, as well as enabling the rigorous evaluation of the KMM. The KMM may also be implemented separately, in secure hardware.

The present invention may support applications that do not depend upon public key cryptography. Symmetric key cryptography is generally sufficient for applications that do not require perfect forward secrecy or non-repudiation. The important feature of hierarchical key management systems is that there is a root entity that can compromise the entire system.

The KMM may support a variety of applications. For example, the security of conditional access systems may depend upon protecting the keys used to decrypt protected content, as well as the logging and charging for use of those keys. An evaluated KMM may be trusted to protect the keys, while the application may be evaluated with respect to key logging and charging.

In a similar fashion, the KMM may support an applications like Kerberos authentication where a ticket-granting service delivers keys cryptographically embedded in tickets to users and resources, enabling them to communicate. The KMM may support ticket creation, delivery, and use, as well as use of the embedded key.

The KMM may differentiate between keys that encrypt other keys (KKs), and keys that encrypt data (DKs). Therefore, any compromised KK may be used to encrypt unknown keys, thus compromising them.

Figure 1:
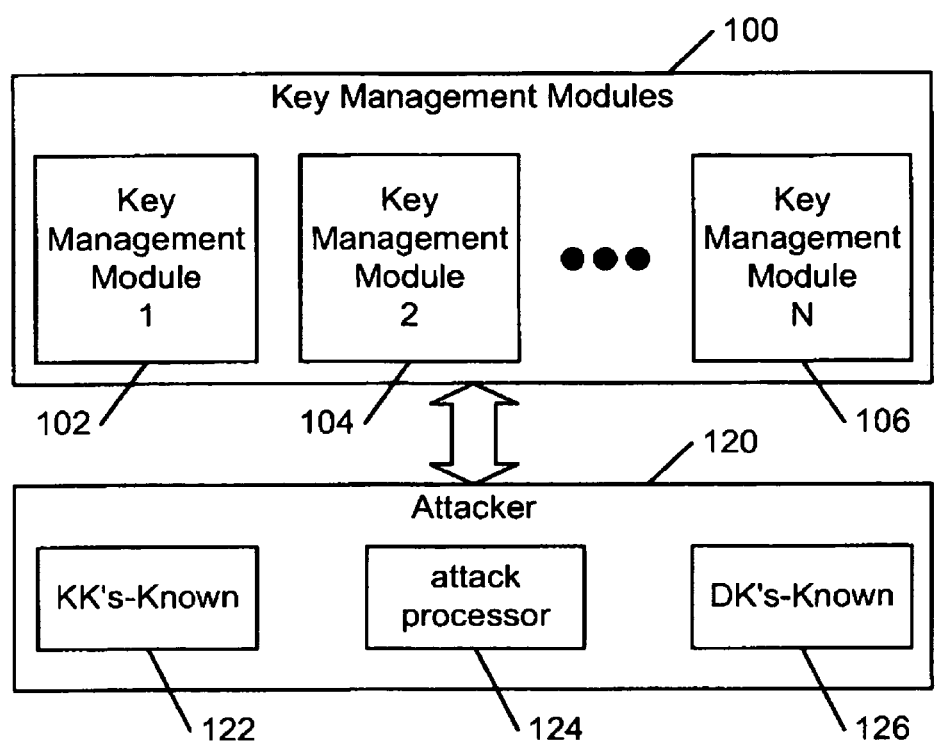
FIG. 1 is a block diagram showing several key management modules and an attacker.
Figure 2:
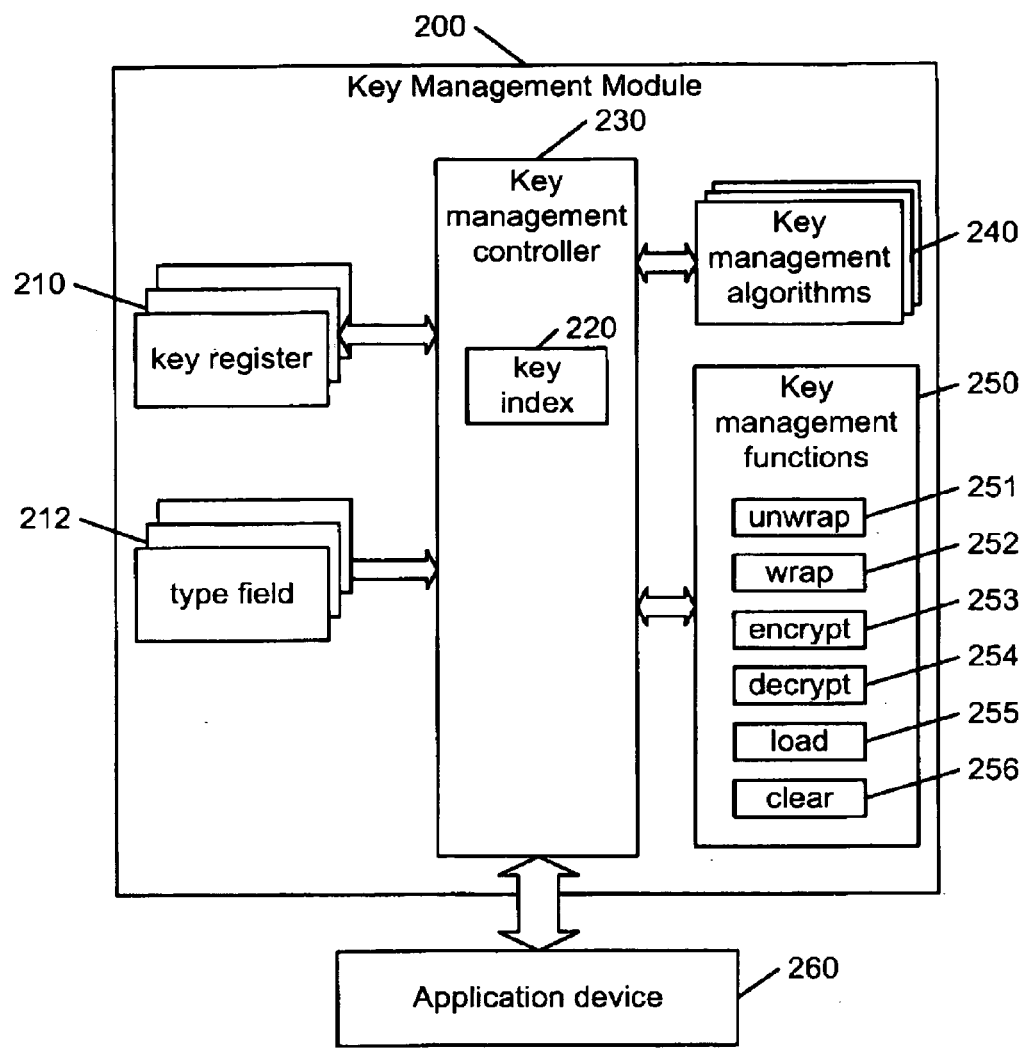
FIG. 2 is a block diagram of an embodiment of a key management module.

Referring to FIG. 1, given a set of key management modules 100 (illustrated as 102, 104, and 106), and two sets of keys that the attacker 120 knows, DKs-KNOWN of DKs 122, and KKs-KNOWN of KKs 126, the system may satisfy the following security properties, in the absence of attacking keys cryptanalytically, or learning them from non-KMM devices:

Invariant: KKs-KNOWN={ }
Invariant: DKs-KNOWN is constant

The attacker 120 may be treated as a machine that uses the keys in KKs-KNOWN 122 in its attacks, in its attempts to add more keys to DKs-KNOWN 126.

Nothing about the KMM may be assumed to be secret, except for the keys. Furthermore, the KMM is preferably designed to limit the consequence of compromise of keys.

The KMM 200 may contain an unspecified number of key registers 210, wherein each register 210 may be specified by a key index 220. The registers 210 may be used to store plaintext keys in a key field. A type field 212 may be associated with each register 210 and may specify whether the associated register is empty, or what the stored key type is. Legitimate key types may be restricted to KK or DK. KKs may be used to wrap (i.e., encrypt) or unwrap (i.e., decrypt) other keys, while DKs may only be used to encrypt plaintext or decrypt ciphertext from outside of the KMM.

The KMM may also include a key management controller 230, key management algorithms 240 and key management functions 250. The key management functions 250 may perform operations used to control a KMM and may include unwrap 251, wrap 252, encrypt 253, decrypt 254, load 255, and clear 256.

The unwrap function 251 may have the form:

$$\text{unwrap(wrapped\_key, type, index, wrapping\_key\_index).} \quad (1)$$

This operation may unwrap the specified 'wrapped_key', using the wrapping key stored in the register 210 referenced by 'wrapping_key_index', using an associated algorithm 240 for unwrapping keys specified by 'type'. The wrapping key is preferably a KK. The unwrapped key may be stored in a register 210 referenced by 'index' in the KMM and the associated type field 212 may be set to 'type'.

The wrap function 252 may have the form:

$$\text{wrapped\_key:=wrap(index, wrapping\_key\_index).} \quad (2)$$

This operation may wrap the index'ed key using the wrapping key stored in the wrapping_key_index'ed register 210, using an algorithm 240 for wrapping keys appropriate for the type 212 of the index'ed key. The wrapping key may be a KK. The wrapped key may be returned.

The encrypt function 253 may have the form:

$$\text{cipher:=encrypt(data, key\_index).} \quad (3)$$

The 'data' may be encrypted by the key in the key_index'ed register 210. The key may be a DK. The cipher may be returned.

The decrypt function 254 may have the form:

$$\text{plaintext:=decrypt(cipher, key\_index).} \quad (4)$$

The cipher may be decrypted by a key in the key_index'ed register 210. The key may be a DK. The plaintext may be returned.

The load function 255 may have the form:

$$\text{load(key, index).} \quad (5)$$

The plaintext 'key' may be stored in the index'ed register 210. The associated type field 212 may be set to DK. This operation preferably allows plaintext DKs to be imported into the KMM, and subsequently used as a DK.

The clear function may have the form:

$$\text{clear(index).} \quad (6)$$

The index'ed register 210 may be cleared, and the associated type field 212 may be set to empty.

Two embodiments of the present invention for utilizing mechanisms for the secure wrapping and unwrapping of keys will now be disclosed. The operations $E_{KK}$ and $D_{KK}$ denote encryption and decryption, respectively, under the key KK.

A DK may be wrapped with a KK as per the first embodiment by:

$$\text{wrapped\_key} := E_{KK}(E_{KK}(DK)) \quad (7)$$

A corresponding unwrap operation may be:

$$DK := D_{KK}(D_{KK}(\text{wrapped\_key})) \quad (8)$$

When this operation is used to unwrap a key, the resultant key type may be set to be a DK. A KK' may be wrapped with a KK by:

$$\text{wrapped\_key} := E_{KK}(KK') \quad (9)$$

A corresponding unwrap operation may be:

$$KK' := D_{KK}(KK') \quad (10)$$

When this operation is used to unwrap a key, the resultant key type may be set to be a KK.

A second embodiment of the present invention may include using a bitwise exclusive-or (denoted as a + operation). To wrap a DK with a KK:

$$\text{wrapped—key} := E_{KK}(DK + E_{KK}(\text{keytag}_{DataKey})) \quad (11)$$

A corresponding unwrap operation may be:

$$DK := D_{KK}(\text{wrapped\_key}) + E_{KK}(\text{keytag}_{DataKey}) \quad (12)$$

When this operation is used to unwrap a key, the resultant key type may be set to be a DK. A KK' may be wrapped with a KK by:

$$\text{wrapped\_key} := E_{KK}(KK' + E_{KK}(\text{keytag}_{KeyKey})) \quad (13)$$

A corresponding unwrap operation may be:

$$KK' := D_{KK}(\text{wrapped\_key}) + E_{KK}(\text{keytag}_{KeyKey}) \quad (14)$$

When this operation is used to unwrap a key, the resultant key type may be set to be a KK. It may be required that all KMMs sharing keys may need to use the same values for $\text{keytag}_{DataKey}$ and $\text{keytag}_{KeyKey}$, where $\text{keytag}_{DataKey} \neq \text{keytag}_{KeyKey}$.

In order to satisfy our security properties, it may be true that known DKs alone cannot be used to learn other DKs (or KKs) by means of the six legitimate operations. If we consider the wrapping and unwrapping of keys at a single level, i.e., where the wrapping/unwrapping operation is fixed, then this attribute may be maintained because a well-designed block cipher has the property that a single bit-inversion between two ciphertext blocks may result in uncorrelated plaintext blocks. It may be interesting to note that chaining a strong block cipher may not preserve this property. Consider, for example, encrypting a double plaintext block $(P_1;P_2)$ under cipher-block chaining where $C_1=E(P_1+IV)$ and $C_2=E(P_2+C_1$ and IV is an initialization vector. Then, since the decryption process yields $D(C_1)+IV$ and $D(C_2)+C_1$, modifying $C_2$ to some $C_2'$ does not affect the value of the first recovered plaintext block.

Next, consider the other potential avenue of attack, which consists of unwrapping or loading a key into a key register such that the plaintext key is a known offset of a key in a register at a different designated level. Suppose, first, that the known offset is 0 (i.e., the bitwise exclusive-or of the two plaintext keys is 0). Then the attacker with such a "duplicate" key at his disposal may learn values of DKs or KKs even if KKs-KNOWN and DKs-KNOWN are initially both null. The key may be used as a KK to wrap a target key (using operation 2), and the output is decrypted by the same key as a DK (using operation 4), resulting in the plaintext target key. If the known offset is not equal to 0, then knowledge of the DK may still imply knowledge of the corresponding KK, which could yield the plaintext target key wrapped under that KK. If the attack is such that a key at level DK may be moved up to level KK with a known offset, the level DK key may be loaded in directly using operation 5. We demonstrate below how designs close to the first and second embodiments of the present invention, respectively, may bee subject to attack because they allow movement of keys between levels.

There are two important design principles in the first embodiment of the present invention. The first principal is that intermediate results of wrap or unwrap operations may not be observable outside the KMM. The second principal is that the application of the wrapping operation for DKs may not be able to be repeatedly applied to effect the wrapping operation for KKs.

With respect to the first principal, if intermediate results were observable, then a DK could be loaded and wrapped, and then transformed within a KMM register to a KK by unwrapping the intermediate wrapping result $E_{KK}(DK)$.

With respect to the second principal, the first embodiment may safely be generalized to having wrapping of DKs involve an even total of block encryption iterations and wrapping of KKs involve an odd total of block encryption iterations.

Notice that, if the wrapping operation for DKs could be iterated to effect wrapping of a KK, as for example if the wrapping of DK is $E_{KK}(DK)$ and the wrapping of KK' is $E_{KK}E_{KK}(KK')$, then wrapping, re-loading, and wrapping a DK could unwrap to a KK.

The important design principle in the second embodiment may be that the keytags may be used indirectly (e.g., after being encrypted by the wrapping key). Specifically, a variant of the second embodiment may not encrypt the keytag under the KK is flawed:

A DK may be wrapped with a KK:

$$\text{wrapped\_key} := E_{KK}(DK + \text{keytag}_{DataKey}) \quad (15)$$

A corresponding unwrap operation may be:

$$DK := D_{KK}(\text{wrapped\_key}) + \text{keytag}_{DataKey} \quad (16)$$

When this operation is used to unwrap a key, the resultant key type may be set to be a DK. To wrap a KK' with a KK:

$$\text{wrapped\_key} := E_{KK}(KK' + \text{keytag}_{KeyKey}) \quad (17)$$

A corresponding unwrap operation may be:

$$KK' := D_{KK}(\text{wrapped\_key})) + \text{keytag}_{KeyKey} \quad (18)$$

When this operation is used to unwrap a key, the resultant key type may be set to be a KK.

This variant may be flawed, because a wrapped DK may be unwrapped as a KK with resulting plaintext value being a known offset from the plaintext DK. Specifically, the plaintext KK may be $D_{KK}(E_{KK}(DK+\text{keytag}_{DataKey})) + \text{keytag}_{KeyKey}$ which is $DK+\text{keytag}_{DataKey}+\text{keytag}_{KeyKey}$.

For the second embodiment of the present invention, wrapping a DK and unwrapping the result as a KK could yield $DK+E_{KK}(\text{keytag}_{DataKey})+E_{KK}(\text{keytag}_{KeyKey})$. Here the offset from DK is not known. Note that since, unlike the first embodiment, this offset may be constant for a given wrapping/unwrapping key, repeating this procedure for two DKs could result in two KKs whose sum is the same as the sum of the two DKs. This property is not exploitable, however, since this gives no advantage in solving for any one of the KKs, even if the two DKs are known.

By further restricting the operations in a KMM, the KMM's security may be tailored to a particular application. For example, KMMs that are intended to be used in hierarchical key management systems with peer-to-peer communication may be subject to more attacks than those used in similar hierarchical systems without peer-to-peer communication.

The compromise of communication between two peers should not spread to compromise of communication with a third peer. However, compromise of communication between a node and the root may compromise all of that node's communication.

Figure 3:
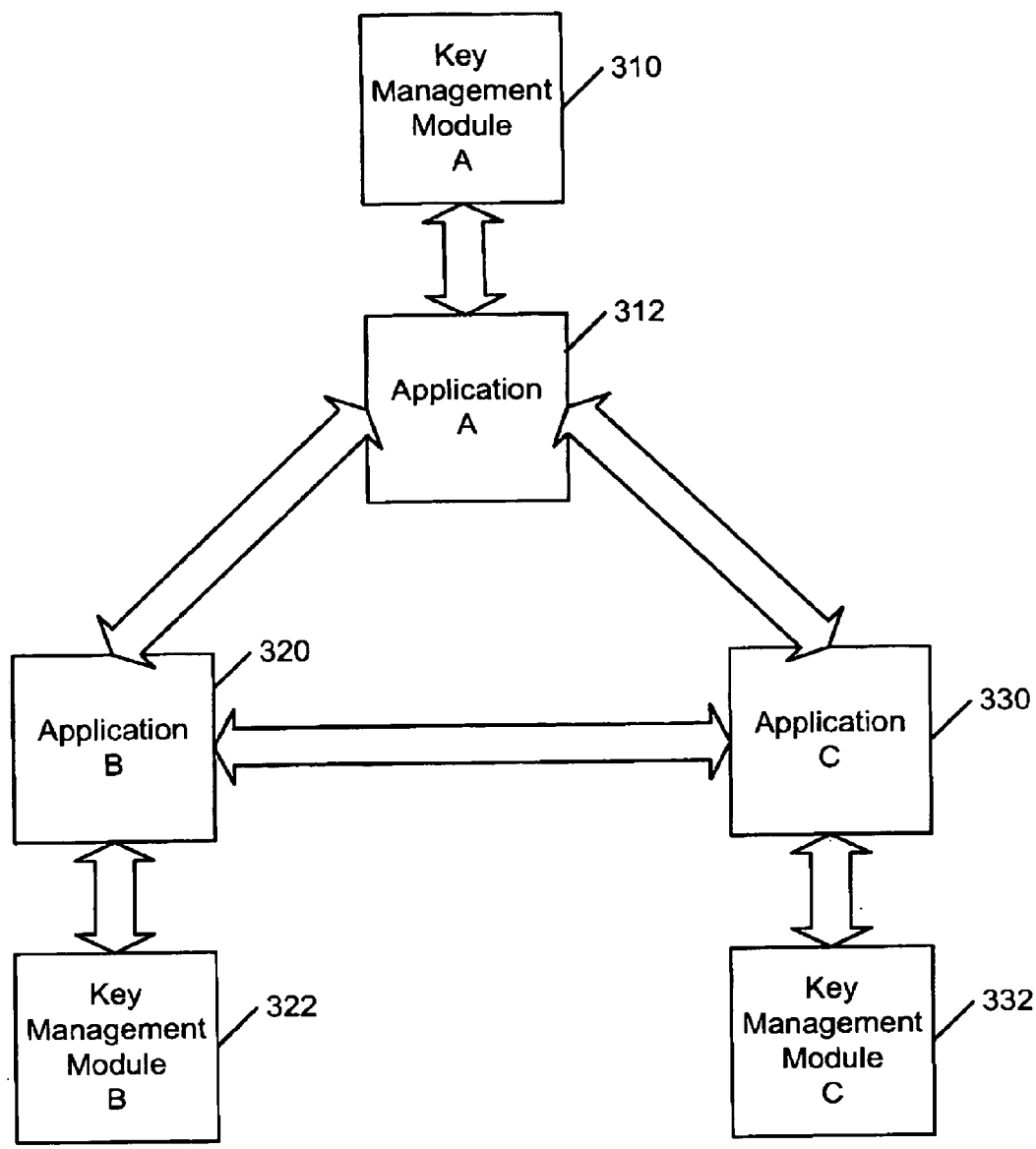
FIG. 3 is a block diagram illustrating several applications with key management modules interacting.

FIG. 3 is a block diagram illustrating three applications A 310, B 320, and C 330, each with a KMM (312, 322, and 332 respecitvely) interacting. Consider the two peers, A 310 and B 320, that communicate via a shared KK'. The root encrypts this KK' under the pair-wise unique KKs that the root shares with each node. The secrecy of B's communication with peers other than A 310 must not depend upon how well A 310 protects KK'.

There may be two levels of attack. In the simpler case, an attacker should not be able to use the shared KK' obtained from A 310 to compromise communication between B 320 and C. This attack may be passive, or active in the sense that the attacker interrupts the communication protocol between B 320 and C 330. This attack may not be possible with the present invention.

At another level, the attacker may not be able to use the shared KK' obtained from A 310, in conjunction with direct use of B's KMM 322, to reveal secrets B 320 shared with C 330. That is, the attacker may use the operations of B's KMM 322 in any way, but may not otherwise compromise B's KMM 322. The attacker uses B's KMM 322 to wrap KKs that B 320 shares with C 330, under the compromised KK' that B 320 shares with A 310.

This latter attack may depend upon a KK being able to wrap keys that were previously wrapped by a different KK. This may enable keys to move between trust domains—between the shared relationship between B 320 and C 330, and the separate relationship between B 320 and A 310.

Countering the attack may require breaking the transitivity of key wrapping and unwrapping operations. This may be done in one of two ways. Either the wrapping operation (operation 2) in the KMM may not be implemented. Or, the target of that operation may be limited to keys that were loaded into the KMM as plaintext (operation 5). Both approaches prevent keys that were meant by the root to enable communication between two peers to be learned by a third peer.

If peers shared only DKs (instead of KKs), neither of these constraints would be necessary, since the attack may not be feasible. However, it may be desirable for peers to share KKs for the long term, and to freshen the session key periodically without contacting the root. The decision when to do this freshening is under the control of the application.

To use the KMM, it must be initialized with one or more keys. One way to do this is to define an operation that enables bootstrapping from a single loaded key such as:

Initialize(key, index) (19)

This command may clear all registers in the KMM, stores one plaintext key in the indexed register, and sets the type of that key to KK. It may be crucial to clear all registers before initializing the KMM. Otherwise, importing a known KK key may allow the compromise of all keys already in the KMM. Furthermore, the application that initialized the KMM may need to destroy its plaintext copy of the key after initializing the KMM.

Notice that because there are no secrets in the KMM's design, loading a single KK key in this way enables the initializing application to load an arbitrary number of keys, by the application simulating the wrapping of those keys with the single KK key before initializing the KMM. These wrapped keys may later be used by the KMM through the unwrap operation (operation 1 above).

One might ask why this single KK used to initialize the KMM is not generated internally to the KMM, perhaps using a built-in random-number generator. Internal generation would be fine if the KMM is meant to be an isolated key storage device. However, if it is meant to communicate with other KMMs, it may need to share a KK with the root.

A more restricted form of simulation (which does not access KKs) may use the KMM itself to mimic KK wrapping operations at the DK level. (This may require that the encryption and decryption functions used in the wrap and unwrap operation are also used to implement the encrypt and decrypt functions in operations 3 and 4, respectively.) Consider the case where a publisher distributes encrypted content to his subscribers. Since subscribers never encrypt content themselves, they may never need the load key operation (operation 5), so that the operation need not be implemented in the KMM.

There are cases such as a where a publisher, for example, may want to use such a restricted KMM to encrypt new content under new DKs. As the publisher encrypts each new content under a new DK, he may want to wrap that key under each customer's KK, so the customer may access the content. But this restricted KMM may not allow loading plaintext DKs. The publisher may still do this, in the following way: Each customer's KK may be stored in the publisher's KMM as a DK. The new content key may encrypted as data under each such DK, to simulate the wrap operation. The customer unwraps the wrapped key in the usual way, and the plaintext key remains within his KMM. Notice that customers' KKs never exist as plaintext outside of a KMM.

The type associated with a key defines the permitted operations that may be done with that key. These operations may be selected to provide the required system functionality, yet not compromise security. Although we define here only two key types, additional key types could give new functionality or further partition functionality. For example, it may be useful to define a hierarchy of KKs, whereby KKs can only wrap KKs of a lower level (or even only the next lower level).

The KMM could also specify several different types of DKs each allowing a specific operation. The data encrypt and decrypt operations in 3 and 4, may be considered as electronic codebook mode (i.e., the core cipher algorithm), from which the application may build other modes, including MAC (message authentication code) authentication. The KMM could also do these operations internally, using data supplied by the application. But such internal operations do not constrain the use of the DK unless the operations may not be combined to build larger operations. For example, if the MAC operation allows internal MAC'ing with an application-specified IV (initialization vector), then the DK essentially may allow generalized electronic codebook mode (and other modes).

The KMM may also include public key negotiation protocols, which may be used to share new KKs between KMMs, provided that the trust relationship between the negotiating KMMs is validated as well. A simple way to add in perfect forward secrecy without requiring authenticated public keys is to mix a shared symmetric key with the result of an ephemeral Diffie-Hellman key agreement.

Unless the restricted form of simulation is important, the encrypt and decrypt functions in the key wrapping operations may not need to use the same cryptography as used by DKs.

If the hierarchical key management system has more than one root, it may be partitioned into parallel KMMs.

The present invention supports hierarchical key management systems. Such infrastructures may support many applications, including Kerberos type authorization systems, and data distribution via conditional access systems. The KMM may prevent controlling application from compromising keys.

The KMM may require only limited internal functionality, to facilitate rigorous evaluation and correct implementation. It may require only the ability to encrypt and decrypt under a strong symmetric cipher, several internal registers for plaintext keys, and control logic for operating on those keys. The control logic defines the operations permitted on each type of key. The supported operations provide the required functionality, yet satisfy the security requirements.

The design technique used by the present invention types keys implicitly, rather than by adding a typing field to the key record. When a wrapped key is unwrapped, the unwrapping mechanism used may define the resultant key type. The key type in turn may define the operations permitted with the key. The security of implicit typing may depend upon the following property: The unwrapping operation may either produce the expected key, or produce random bits which may be unknown to the attacker. Although those random bits could then be used as a legitimate key, the attacker may not learn information in that way. Implicit typing preferably avoids the complexity of guaranteeing the integrity of a larger key record.

We claim:

1. An apparatus for key management comprising:
   (a) a multitude of key registers;
   (b) a multitude of type fields, wherein each type field is associated with a key register;
   (c) a key management controller;
   (d) key management algorithms; and
   (e) a plurality of key management functions, said plurality of key management functions including a plurality of unwrap operations;
   wherein the type of an unwrapped key produced is determined by which one of said plurality of unwrap operations is used.

2. The apparatus according to claim 1 wherein each type field contains at least one of the values including KK, DK, and null.

3. The apparatus according to claim 2 wherein the contents of a key register with an associated type field whose value is KK is used to encrypt and decrypt the contents of other key registers.

4. The apparatus according to claim 1 wherein said key management functions include an unwrap function, said unwrap function including:
   (a) a wrapped key parameter for specifying an unwrapping key;
   (b) a type parameter for specifying an unwrapping key type;
   (c) an index parameter for specifying where to store the unwrapped key; and
   (d) a wrapped key index parameter for specifying a wrapped key;
   said unwrap function capable of unwrapping the wrapped key using the specified unwrapping key and an algorithm determined by the unwrapping key type.

5. The apparatus according to claim 1 wherein said key management functions include a wrap function, wherein said wrap function includes:
   (a) an index parameter for specifying a wrapping key; and
   (b) a wrapping key index parameter for specifying a wrapping key key;
   said wrap function capable of wrapping the wrapping key using the specified wrapping key key.

6. The apparatus according to claim 1 wherein said key management functions include a data encryption function, said data encryption function includes:
   (a) a data parameter for specifying encryption data; and
   (b) a key index parameter for specifying an encryption key;
   said encryption function capable of encrypting the specified encryption data using the specified encryption key.

7. The apparatus according to claim 1 wherein said key management functions include a data decryption function, wherein said data decryption function includes:
   (a) a cipher parameter for specifying a cipher for decryption; and
   (b) a key index parameter for specifying a decryption key;
   said decryption function capable of decrypting the specified cipher using the specified decryption key.

8. The apparatus according to claim 1 wherein said key management functions include a data load function, wherein said data load function includes:
   (a) a key parameter for specifying a plaintext key; and
   (b) an index parameter for specifying a destination key register;
   said data load function capable of loading the specified plaintext key into the destination key register.

9. The apparatus according to claim 1 wherein said key management functions include a register clear function, wherein said register clear function includes an index parameter for specifying a key register, and is capable of clearing the specified key register and an associated type field.

10. The apparatus according to claim 1 wherein said key management functions include an initialize function, wherein said initialize function is capable of:
    (a) clearing said multitude of key registers;
    (b) storing a specified plaintext key in an indexed register; and
    (c) storing a KK value in the type field associated with the indexed register.

11. The apparatus according to claim 1 wherein said multitude of key registers has a hierarchy.

12. The apparatus according to claim 11 wherein said contents of a key register can only be used to wrap the contents of a lower hierarchical level key register.

13. The apparatus according to claim 11 wherein said hierarchy has more than one root.

14. The apparatus according to claim 1 wherein a key management function uses a key management algorithm determined by the value stored in the type field associated with the key register being operated on by said key management function.

15. The apparatus according to claim 1 wherein said apparatus uses public key negotiation protocols to share new keys with other key management apparatuses.

16. The apparatus according to claim 1 wherein said key management algorithms includes an encryption algorithm for wrapping a DK with a KK, wherein the wrapped data key=EKK(EKK(DK)).

17. The apparatus according to claim 1 wherein said key management algorithms include a decryption algorithm for unwrapping a DK with a KK, wherein the wrapped data key=EKK(EKK(DK)).

18. The apparatus according to claim 1 wherein said key management algorithms include encryption and decryption algorithms that use a bitwise exclusive-or operator.

19. A method for key management comprising the steps of:
 (a) storing a data key in a key register;
 (b) storing a data type for said data key in an associated type field;
 (c) storing a key key in a key register;
 (d) storing a key type for said key key in an associated type field; and
 (e) performing one of a plurality of key management functions using a key management algorithm, said plurality of key management functions including a plurality of unwrap operations:
 wherein the type of an unwrapped key produced is determined by which one of said plurality of unwrap operations is used.

20. The method according to claim 19 wherein said data type is at least one of the values including KK, DK, and null.

21. The method according to claim 19, wherein said step of performing a key management function includes performing an unwrap function, said unwrap function includes the steps of:
 (a) retrieving an unwrapping key from a key register;
 (b) retrieving an unwrapping key type;
 (c) determining where to store an unwrapped key;
 (d) retrieving a wrapped key; and
 (e) unwrapping the wrapped key using the unwrapping key and an algorithm determined by the unwrapping key type.

22. The method according to claim 19, wherein said step of performing a key management function includes performing a wrap function, wherein said wrap function includes the steps of:
 (a) retrieving a wrapping key;
 (b) retrieving a wrapping key key; and
 (c) wrapping the wrapping key using the wrapping key key.

23. The method according to claim 19, wherein said step of performing a key management function includes performing a data encryption function, said data encryption function includes the steps of:
 (a) retrieving data for encryption;
 (b) retrieving an encryption key; and
 (c) encrypting the data using the encryption key.

24. The method according to claim 19, wherein said step of performing a key management function includes performing a data decryption function, wherein said data decryption function includes the steps of:
 (a) retrieving a cipher;
 (b) retrieving a decryption key; and
 (c) decrypting the cipher using the decryption key.

25. The method according to claim 19, wherein said step of performing a key management function includes performing a data load function, wherein said data load function includes the steps of:
 (a) retrieving a plaintext key;
 (b) determining a destination key register; and
 (c) loading the specified plaintext key into the destination key register.

26. The method according to claim 19, wherein said step of performing a key management function includes performing a register clear function, wherein said register clear function includes the steps of:
 (a) clearing a specified key register; and
 (b) clearing an associated type field.

27. The method according to claim 19, wherein said step of performing a key management function includes performing an initialize function, wherein said initialize function includes the steps of:
 (a) clearing a multitude of key registers;
 (b) storing a specified plaintext key in an indexed key register; and
 (c) storing a KK value in the type field associated with the indexed register.

28. The method according to claim 19, wherein said key register is part of a hierarchy of key registers.

29. The method according to claim 28, wherein said contents of the key register can only be used to wrap the contents of a lower hierarchical level key register.

30. The method according to claim 28, wherein said hierarchy has more than one root.

31. The method according to claim 19, wherein the step of performing a key management function further includes using a key management algorithm determined by the value stored in the type field associated with the key register being operated on by said key management function.

32. The method according to claim 19, further including the step of sharing new keys with other key management apparatuses using public key negotiation protocols.

* * * * *